US009848042B1

(12) United States Patent
Parkhurst

(10) Patent No.: US 9,848,042 B1
(45) Date of Patent: Dec. 19, 2017

(54) SYSTEM AND METHOD FOR DATA MIGRATION BETWEEN HIGH PERFORMANCE COMPUTING ARCHITECTURES AND DE-CLUSTERED RAID DATA STORAGE SYSTEM WITH AUTOMATIC DATA REDISTRIBUTION

(71) Applicant: DATADIRECT NETWORKS, INC., Chatsworth, CA (US)

(72) Inventor: Micheal S. Parkhurst, Newbury Park, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 334 days.

(21) Appl. No.: 14/725,507

(22) Filed: May 29, 2015

(51) Int. Cl.
G06F 15/16 (2006.01)
H04L 29/08 (2006.01)
G06F 3/06 (2006.01)

(52) U.S. Cl.
CPC ........ H04L 67/1095 (2013.01); G06F 3/0611 (2013.01); G06F 3/0647 (2013.01); G06F 3/0685 (2013.01); G06F 3/0689 (2013.01); H04L 67/1097 (2013.01)

(58) Field of Classification Search
CPC ............. H04L 65/4069; H04L 65/4084; H04L 65/601; H04L 65/608; H04L 67/02; H04L 67/06; H04L 69/14; H04N 21/26258; H04N 21/44209; H04N 21/4621; H04N 21/4622; H04N 21/631; H04N 21/8456
USPC ......................................................... 709/231
See application file for complete search history.

(56) References Cited

U.S. PATENT DOCUMENTS

2010/0325218 A1* 12/2010 Castro ................... G06Q 50/01
709/206
2014/0206346 A1* 7/2014 Kiukkonen ....... H04W 52/0229
455/426.1

OTHER PUBLICATIONS

Edward K. Lee, et al., "Petal: Distributed Virtual Disks", published in the Proceedings of the Seventh International Conference on Architectural Support for Programming Languages and Operating Systems, 1996.
Mark Holland, et al., "Parity De-clustering for Continuous Operation in Redundant Disk Arrays", published in Proceedings of the Fifth Conference on Architectural Support for Programming Languages and Operating Systems, 1992.

* cited by examiner

*Primary Examiner* — Normin Abedin
(74) *Attorney, Agent, or Firm* — Rosenberg, Klein & Lee

(57) ABSTRACT

A system and method for data migration between data generating entities and de-clustered RAID storage employs a data re-distribution approach with the purpose of eliminating drives thrashing and attain an even I/O activity distribution for Physical Disk Extents (PDEs) residing on Physical Disks. The system monitors the I/O activity map, identifies competing over-used PDEs residing on the same physical disk drive, and if the drive thrashing is detected, re-directs "write" or "read" requests from the over-used PDEs to a different physical disk or to underused PDEs on the same physical disk.

20 Claims, 8 Drawing Sheets

VD1 ALLOCATION

| Row | D1 | D2 | D3 | D4 | D5 | D6 | D7 | D8 | P | Q |
|---|---|---|---|---|---|---|---|---|---|---|
| 0 | 45:0 | 137:0 | 244:1 | 312:0 | 376:0 | 439:0 | 549:0 | 613:0 | 722:0 | 800:0 |
| 1 | 22:0 | 128:0 | 171:0 | 285:0 | 346:0 | 476:0 | 558:0 | 591:0 | 733:0 | 766:0 |
| 2 | 59:0 | 165:0 | 171:1 | 292:0 | 411:0 | 443:0 | 588:1 | 643:0 | 723:0 | 786:0 |
| 3 | 25:0 | 88:0 | 244:1 | 293:0 | 394:0 | 465:0 | 573:0 | 626:0 | 716:0 | 811:0 |
| 4 | 82:0 | 107:0 | 227:0 | 254:0 | 345:0 | 443:1 | 581:0 | 661:0 | 743:0 | 769:0 |
| 5 | 39:0 | 124:0 | 171:3 | 295:0 | 397:0 | 487:0 | 515:0 | 668:0 | 735:0 | 836:0 |
| 6 | 77:0 | 157:0 | 225:0 | 263:0 | 372:0 | 496:0 | 583:0 | 621:0 | 752:0 | 762:0 |

FIG. 5A

VD2 ALLOCATION

| Row | D1 | D2 | D3 | D4 | D5 | D6 | D7 | D8 | P | Q |
|---|---|---|---|---|---|---|---|---|---|---|
| 0 | 29:0 | 150:0 | 215:0 | 329:0 | 416:0 | 500:0 | 574:0 | 652:0 | 679:0 | 815:0 |
| 1 | 24:0 | 125:0 | 204:0 | 279:0 | 338:0 | 493:0 | 552:0 | 597:0 | 738:0 | 783:0 |
| 2 | 74:0 | 91:0 | 209:0 | 269:0 | 383:0 | 481:0 | 529:0 | 616:0 | 717:0 | 781:0 |
| 3 | 22:1 | 123:0 | 244:2 | 271:0 | 418:0 | 502:0 | 511:0 | 594:0 | 723:0 | 789:0 |
| 4 | 10:0 | 167:0 | 219:0 | 310:0 | 362:0 | 439:0 | 506:0 | 628:0 | 702:0 | 773:0 |
| 5 | 79:0 | 95:0 | 190:0 | 330:0 | 403:0 | 487:1 | 582:0 | 622:0 | 721:0 | 782:0 |
| 6 | 8:0 | 100:0 | 209:1 | 287:0 | 359:0 | 458:0 | 578:0 | 660:0 | 747:0 | 798:0 |

FIG. 5B

VD1 After Re-Distribution

| Row | D1 | D2 | D3 | D4 | D5 | D6 | D7 | D8 | P | Q |
|---|---|---|---|---|---|---|---|---|---|---|
| 0 | 45:0 | 137:0 | 244:1 | 312:0 | 376:0 | 439:0 | 549:0 | 613:0 | 722:0 | 800:0 |
| 1 | 22:0 | 128:0 | 171:0 | 285:0 | 346:0 | 476:0 | 558:0 | 591:0 | 733:0 | 766:0 |
| 2 | 59:0 | 165:0 | 171:1 | 292:0 | 411:0 | 443:0 | 588:1 | 643:0 | 723:0 | 786:0 |
| 3 | 25:0 | 88:0 | 244:0 | 293:0 | 394:0 | 465:0 | 573:0 | 626:0 | 716:0 | 811:0 |
| 4 | 82:0 | 107:0 | 227:0 | 254:0 | 345:0 | 443:1 | 581:0 | 661:0 | 743:0 | 769:0 |
| 5 | 39:0 | 124:0 | 171:3 | 295:0 | 397:0 | 478:0 | 515:0 | 668:0 | 735:0 | 836:0 |
| 6 | 77:0 | 157:0 | 225:0 | 263:0 | 372:0 | 496:0 | 583:0 | 621:0 | 752:0 | 762:0 |

FIG. 7A

VD2 After Re-Distribution

| Row | D1 | D2 | D3 | D4 | D5 | D6 | D7 | D8 | P | Q |
|---|---|---|---|---|---|---|---|---|---|---|
| 0 | 29:0 | 150:0 | 215:0 | 329:0 | 416:0 | 500:0 | 574:0 | 652:0 | 679:0 | 815:0 |
| 1 | 24:0 | 125:0 | 204:0 | 279:0 | 338:0 | 493:0 | 552:0 | 597:0 | 738:0 | 783:0 |
| 2 | 74:0 | 91:0 | 209:0 | 269:0 | 383:0 | 481:0 | 529:0 | 616:0 | 717:0 | 781:0 |
| 3 | 22:1 | 123:0 | 210:0 | 271:0 | 418:0 | 502:0 | 511:0 | 594:0 | 723:0 | 789:0 |
| 4 | 10:0 | 167:0 | 219:0 | 310:0 | 362:0 | 439:0 | 506:0 | 628:0 | 702:0 | 773:0 |
| 5 | 79:0 | 95:0 | 190:0 | 330:0 | 403:0 | 487:1 | 582:0 | 622:0 | 721:0 | 782:0 |
| 6 | 8:0 | 100:0 | 209:1 | 287:0 | 359:0 | 458:0 | 578:0 | 660:0 | 747:0 | 798:0 |

FIG. 7B

SYSTEM AND METHOD FOR DATA MIGRATION BETWEEN HIGH PERFORMANCE COMPUTING ARCHITECTURES AND DE-CLUSTERED RAID DATA STORAGE SYSTEM WITH AUTOMATIC DATA REDISTRIBUTION

FIELD OF THE INVENTION

The present invention is directed to data migration between high performance computing cluster architectures (data generating entities) and data storage media. Particularly, the present invention relates to a data migration technique rendering an evenly distributed I/O activity favored by data storage disks with the result of improved I/O activity latency in the system.

Further in particular, the present invention relates to a data storage system supported by redundant disk arrays architecture organized for parity de-clustering in which an automatic data redistribution is performed upon an exceedingly active usage of competing data storage units (Physical Data Extents) residing on the same physical disk being detected, while the thrashing disk drive operation is present, with the purpose of separation of the over used Physical Data Extents into different physical disks with the effect of reducing the drive actuator thrashing between the Physical Data Extents.

In overall concept, the present invention is directed to a data storage system and method which are enhanced by employing a re-distribution management sub-system configured to monitor the I/O activity of data computing architectures relative to the de-clustered Redundant Array of Independent Disks (RAID) storage sub-system with the purpose of identification of Physical Disk Extents (PDE) exhibiting the I/O activity exceeding a predetermined activity level, and reducing the "load" to the physical disk actuator supporting the I/O activity related to the data storage units in question by either re-directing (re-addressing) the I/O request from the "hot" PDEs to another physical disk or to a PDE with a lower I/O activity on the same physical disk, thereby optimizing the operation of the system by evenly spreading the I/O activity among the PDEs residing on physical data storage disks in the system, and thus reducing (or eliminating) actuator thrashing between the PDEs residing in the same physical data storage disk.

Furthermore, the present invention is directed to a data migration and storage system which performs RAID calculations on the random ingress data received from the data generating architectures prior to storing the data, thus providing data reliability and preserving data integrity. Through data reconstruction of corrupted data and data integrity checking, when needed, and where a parity stripe unit (containing a predetermined number of data units and at least one parity unit computed for the data stripe unit) is distributed in redundant disk arrays in accordance with parity de-clustering principles, and where an automatic data re-distribution (re-allocation) is performed in the environment of the de-clustered RAID storage system.

BACKGROUND OF THE INVENTION

Computer clusters, or groups of linked computers, have been widely used to improve performance over that provided by a single computer, especially in extended computations, for example, involving simulations of complex physical phenomena, etc. Conventionally, in a computer cluster, computer nodes (also referred to herein as client nodes, or data generating entities) are linked by a high speed network which permits the sharing of the computer resources and memory. Data transfers to or from the computer nodes are performed through the high speed network and are managed by additional computer devices, also referred to as file servers. The file servers file data from multiple computer nodes and assign a unique location for each computer node in the overall file system. Typically, the data migrates from the file servers to be stored on rotating media such as, for example, common disk drives arranged in storage disk arrays, or solid-state storage devices for storage and retrieval of large amount of data. Arrays of solid-state storage devices such as flash memory, phase change memory, memristors, or other non-volatile storage units, are also broadly used in data storage systems.

The most common type of a storage device array is the RAID (Redundant Array of Inexpensive (Independent) Drives). The main concept of the RAID is ability to virtualize multiple drives (or other storage devices) in a single drive representation. A number of RAID schemes have evolved, each designed on the principles of aggregated storage space and data redundancy.

Most of the RAID schemes employ an error protection scheme called "parity" which is a widely used method in information technology to provide for tolerance in a given set of data.

For example, in the RAID-5 data structure, data is striped across the hard drives, with a dedicated parity block for each stripe. The parity blocks are computed by running the XOR comparison of each block of data in the stripe. The parity is responsible for the data fault tolerance. In operation, if one disk fails, a new drive can be put in its place, and the RAID controller can rebuild the data automatically using the parity data.

Alternatively to the RAID-5 data structure, the RAID-6 scheme uses the block-level striping with double distributed parity P1+P2, and thus provides fault tolerance from two drive failures. They can continue to operate with up to two failed drives. This makes larger RAID groups more practical, especially for high availability systems.

Ever since the adoption of RAID technology in data centers, there has been the problem of one application (or one host) dominating the usage of drives involved in the RAID. As a result, other hosts (or applications) are resource starved and their performance may decrease. A typical solution in the past was to dedicate a certain number of drives to the particular host (or application) so that it does not affect the others.

With the introduction of de-clustered RAIDs organizations, virtual disks are dynamically created out of large pool of available drives with the intent that a RAID rebuild will not involve a large number of drives working together, and thus reduce the window of vulnerability for data loss. An added benefit is that random READ/WRITE I/O (input/output) performance is also improved.

Parity de-clustering for continued separation in redundant disk arrays has advanced the operation of data storage systems. The principles of parity de-clustering are known to those skilled in the art and presented, for example, in Edward K. Lee, et al., "Petal: Distributed Virtual Disks", published in the Proceedings of the Seventh International Conference on Architectural Support for Programming Languages and Operating Systems, 1996; and Mark Holland, et al., "Parity De-clustering for Continuous Operation in Redundant Disk Arrays", published in Proceedings of the Fifth Conference on Architectural Support for Programming Languages and Operating Systems, 1992.

FIG. 1A, as shown in Mark Holland, et al., represents the principle of parity and data layout in traditional RAID-5 organization. Di,j shown in FIG. 1A, represents one of the four data units in parity stripe number i, and Pi represents the parity unit for parity stripe i. Parity units are distributed across the disks of the array to avoid the write bottleneck that would occur in a single disk containing all parity units. The disk array's data layout provides obstruction of a linear ("logical block") address spaced to the file system. In addition to mapping the data units to parity stripes, the illustrated RAID-5 organization also specifies the data layout: data is mapped to stripe units Di,j according to ascending j within ascending ji, meaning that user data is logically D0.0, D0.1, D0.2, D0.3, D1.0, D1.1, etc.

In FIG. 1A, parities computed over the entire width of the array, that is, P0 is accumulative parity (XOR) of data units D0.0-D0.3. When a disk is identified as failed, any data unit can be reconstructed by reading the corresponding units in the parity stripe, including the parity unit, and computing the cumulative XOR of this data. All the disks in the array are needed by every access that requires reconstruction.

Let G be the number of units in a parity stripe, including the parity unit, and consider the problem of decoupling G from the number of disks in the array. This reduces to a problem of finding a parity mapping that will allow parity stripes of size G units to be distributed over some larger number of disks, C. The larger set of C disks is considered to be a whole array. For comparison purposes, the RAID-5 example in FIG. 1A has G=C=5. This property (G=C) defines RAID-5 mappings.

One perspective of the concept of parity de-clustering in redundant disk arrays is demonstrated in FIG. 1B where a logical RAID-5 array with G=4 is distributed over C=7>G disks, each containing fewer units. The advantage of this approach is that it reduces the reconstruction workload applied to each disk during failure recovery. Here for any given stripe unit on a failed (physical) disk, the parity stripe to which it belongs includes units on only a subset of the total number of disks in the array. In FIG. 1B, for example, disk 2, 3 and 6 do not participate in the reconstruction of the parity stripe marked "S". Hence, these disks are called on less often in the reconstruction of one or the other disks. In contrast, RAID-5 array has C=G, and so all disks participate in reconstruction of all units of the failed disk.

FIG. 1C represents a de-clustered parity layout for G=4 and C=5. It is important at this point that fifteen data units are mapped onto five parity stripes in the array's first 20 disk units, while in the RAID-5 organization shown in FIG. 1A, sixteen data units are mapped onto four parity stripes in the same number of disk units.

More disk units are consumed by parity, but not every parity stripe is represented on each disk, so a smaller fraction of each surviving disk is read during reconstruction. For example, if in FIG. 1C, disk 0 fails, parity stripe 4 will not have to be read during reconstruction. Note that the successive stripe units in a parity stripe occur in varying disk offsets.

As presented in Edward K. Lee, et al., clients use the de-clustered redundant disk arrays as abstract virtual disks each providing a determined amount of storage space built with data storage units (blocks) of physical disks included in the virtual disk.

Unfortunately, using all of the available drives in de-clustered RAID architectures precludes the option of isolating ill-behaved applications (or hosts) from the rest of the system.

Virtual disks are provided in de-clustered RAID organizations in an attempt to evenly distribute the data over as many drives as possible. Unfortunately, not all host activity for a specific virtual disk is evenly distributed. As a result, certain sections of a virtual disk have more activity than others, and some virtual disks will in general have more activity than others as well. Compounding the activity inequality is that changes in activity may occur over periods of days or weeks, which means that previously inactive virtual disk may suddenly become very active, and a virtual disk that had been active for weeks might suddenly become inactive for months.

Currently this problem is approached in the field by the concept of moving contents of entire virtual disks, or sub-sections of a virtual disk, to another storage tier (such as solid-state disk versus fast drives versus near line drives) based on activity rather than resolving activity conflicts within a tier of data storage disks.

Another approach is to employ a solid-state disk READ cache. This performance improvement is typically carried out via hierarchical storage management which moves data sets from one type of media to another, i.e., from SATA (Serial ATA) physical disks to SAS (Serial attached SCSI) physical disks, fiber channel physical disk, or solid-state disks. Data that is not in current use is often pushed out to slower speed media from fast speed media. Block storage devices such as the SFA (Storage Fusion Architecture) often do not have visibility of the data storage on them. As a result, an SFA device must move the entire contents of virtual disk to slower or faster media in order to improve overall system performance.

It is therefore clear that a more efficient approach requiring no large data volumes movement from media to media and providing an evenly distributed I/O activity in the data storage de-clustered RAID system would greatly benefit the RAID technology.

SUMMARY OF THE INVENTION

It is therefore an object of the present invention to provide a data migration system and method supported by a de-clustered RAID storage system where automatic data re-distribution is performed once an uneven I/O activity is detected with the purpose of reducing an unwanted actuator thrashing between different areas of a disk drive.

It is another object of the present invention to provide a de-clustered RAID storage system with virtual disks constructed from a sequence of Physical Disk Extents (PDEs), and where I/O activity for a collection of PDEs is monitored to find PDEs exhibiting an overly high usage, and where the I/O activity is automatically re-distributed to either separate the highly active PDEs into different physical disks, or to re-address data to a PDE on the same physical disk but exhibiting a low I/O activity once the drive thrashing is detected. This is performed with the goal to reduce actuator thrashing between PDEs on the same physical disk.

It is a further object of the present invention to provide an automatic data re-distribution approach in a de-clustered RAID storage system based on dynamically monitored I/O activity with the purpose of providing an evenly distributed I/O activity over the PDEs residing on the physical disks in a flexible and dynamical fashion which does not require large data volume movement from media to media.

In one aspect, the present invention is directed to a system for data migration between data generated entities and data storage arrays, which includes a de-clustered Redundant Array of Independent Disks (RAID) storage sub-system residing on a plurality of physical data storage disks. Each of the plurality of physical data storage disks is "carved" into a respective number of Physical Disk Extents (PDEs), each constituting a data storage unit of a predetermined size and having a physical address associated with the corresponding physical disk.

At least one virtual disk structure is formed to reside on at least a portion of the plurality of physical data storage disks. The virtual disk(s) include(s) an array of respective PDEs with each PDE defined by a respective Logical Block Address (LBA) in the virtual disk structure.

A plurality of data generating entities are operatively coupled to the de-clustered RAID storage sub-system for migration of data therebetween. Each data generating entity is configured to issue at least one request for data migration between the data generating entity and at least one PDE of interest. The PDE of interest is identified in the request by an LBA (Logic Block Address).

At least one controller sub-system is operatively coupled between the data generating entity and at least portion of the plurality of physical data storage disks. The controller sub-system is configured to control data migration relative to the PDEs residing on the physical data storage disks.

A unique approach implemented in the present system is supported by a re-distribution management processor sub-system which resides in an operative coupling to the controller sub-system and the data generating entities.

The re-distribution management processor sub-system in question includes an I/O activity monitoring processor unit operatively coupled to the data generating entity and a respective sequence of PDEs. The I/O activity monitoring processor unit is configured to identify at least two PDEs with the I/O activity exceeding a first predetermined I/O activity level, and at least two PDEs exhibiting the I/O activity below a second predetermined I/O activity level.

An I/O activity allocation optimization processor sub-system is included in the re-distribution management processor sub-system. The allocation optimization processor sub-system is operatively coupled to the I/O activity monitoring processor unit and is configured to determine whether the PDEs with the I/O activity exceeding the first predetermined level reside at the same physical data storage disk, and whether the drive thrashing is present. If this is a case, and if the overused PDs reside at the same physical disk with the PDEs exhibiting the I/O activity below the second predetermined level, the I/O activity allocation unit re-directs the request from one of the overly active PDEs to the under-used PDEs (either on the same disk, or on a different disk) to result in an evenly distributed I/O activity between the PDEs.

A parity stripe is distributed in the virtual disk across the respective number of PDEs. The parity stripe contains at least one data unit and a corresponding at least one data parity unit XOR computed for the data unit(s) in question.

The re-distribution management sub-system further includes a global timer unit defining a sampling time for the I/O activity monitoring unit to capture the number of times each of the PDEs being accessed.

The system may be supplemented with one, or a number of virtual disk structures, each associated with a respective array of PDEs. When a number of virtual disk structures are formed, then a storage controller sub-system is operatively coupled to respective physical data storage disks involved in the virtual disk. Each of the storage controller sub-systems supports the re-distribution management sub-system in a peer-to-peer fashion. If a storage controller fails, another storage controller assumes the functions of the failed storage controller.

The virtual disk structures may have at least one over-lapping physical data storage disk, with at least two over-active PDEs residing on the overlapping physical data storage disk. To overcome a possible resource contention situation, the re-distribution management sub-system activates the optimization sub-system to re-direct the I/O request from at least one PDE exhibiting the I/O activity exceeding a predetermined level to at least one PDE exhibiting the I/O activity below a predetermined level if at least two highly accessed PDEs reside on the overlapping physical data storage disk, and drive thrashing is detected.

The re-distribution sub-system further includes a mapping unit operatively coupled between at least one data generating entity and at least one controller sub-system. The mapping unit operates to compute a correspondence between the LBA of the PDE of interest defined in the request issued by the data generating entity and a physical address of the PDE of interest.

Preferably, an I/O activity map generating unit is operatively coupled to the mapping unit. The I/O activity map generating unit operates to create an I/O activity map representative of an I/O activity of the data generating entity mapped to the sequence of the PDEs in the virtual disks.

Another aspect of the present invention is directed to a method for automatic data re-distribution (re-allocation) in a parity de-clustered redundant storage system, which is carried out through the steps of distributing a de-clustered Redundant Array of Independent Disks (RAID) on a plurality of physical data storage disks, and allocating a respective number of Physical Disk Extents (PDEs) at each physical data storage disk of the plurality thereof. Each PDE of the respective number thereof constitutes a data storage unit having a predetermined size and a physical address on a corresponding physical data storage disk.

The method continues by forming at least one virtual disk structure from a sequence of respective PDEs residing on at least a portion of the plurality of physical data storage disks in the storage system. Each respective PDE included in the virtual disk structure is identified by a respective Logical Block Address (LBA).

A plurality of data generating entities are operatively coupled to at least one virtual disk structure. At least one data generating entity generates a respective request for data migration between the data generating entity and at least one PDE of interest included in the virtual disk structure. The request contains an LBA of the PDE of interest.

At least one controller sub-system is coupled between the data generating entity and at least portion of the plurality of physical data storage disks for controlling request execution relative to the PDE of interest.

The method further continues through the steps of configuring at least one controller sub-system with a re-distribution processor unit in operative coupling to the data generating entity;

monitoring, by the re-distribution processor unit, an I/O activity of the data generating entity relative to the respective number of PDEs;

identifying, among the respective number of PDEs, at least two first PDEs exhibiting the I/O activity exceeding a first predetermined I/O activity level and at least two second PDEs exhibiting the I/O activity level below a second predetermined I/O activity level;

determining whether at least two first PDEs reside at the same physical data storage disk and the disk thrashing presents; and redirecting the request from a respective one of the first PDEs to another PDE to eliminate the disk thrashing. If the over-used PDEs reside on the same drive with the under-used PDEs, the initial request toward one of the over-used PDEs is redirected to one of the second PDEs if the two first PDEs reside on the same physical data storage disk, and the second PDE resides at a different physical data storage disk.

If the second PDE resides at the same physical data storage disk with the first PDEs, the request from the first PDE is re-allocated to another of the second PDEs.

The re-distribution processor unit performs the routine of computing a correspondence between the LBA of the PDE of interest and the physical address of the PDE of interest. Upon computing the correspondence between the LBA and the physical address of the PDE of interest, the method continues by generating (by the re-distribution processor unit) an I/O activity map, i.e., a graph representative of an I/O activity of the data generating entity relative to the PDEs residing on a specific portion of the plurality of physical data storage disks.

The subject method further proceeds by performing the steps of establishing a global timer processor unit identifying a sampling time, upon actuating of the global timer processor unit, and prior to expiration of the sampling time, deciding, by the re-distribution processor unit, whether the at least one respective request is data "write" or data "read" request, computing the physical address of the PDE of interest on a respective physical data storage disk the PDE of interest resides on, and incrementing an entry in a PDE counter in an heuristic table for the PDE of interest, when a drive head of the respective physical data storage disk performed a movement.

If the sampling time has expired, the method proceeds through the steps of scanning the heuristic table for a predetermined number of the over-active PDE counters and a predetermined number of the relatively inactive PDE counters, and clearing PDE counters in the heuristic table.

These and other features and advantages of the present invention will become apparent after reading further description of the preferred embodiment(s) in conjunction with the accompanying Patent Drawings in the current Patent Application.

BRIEF DESCRIPTION OF THE DRAWINGS

FIGS. 5A and 5B show exemplary allocations of Physical Disk Extents in respective virtual disks (Virtual Disk 1 and Virtual Disk 2);

FIGS. 7A and 7B are representative of the resulting I/O activity allocation in the virtual disk 1 and the virtual disk 2 after application of the data re-distribution procedure of the present invention.

PREFERRED EMBODIMENT OF THE PRESENT INVENTION

Figures 1A, 1B, 1C:
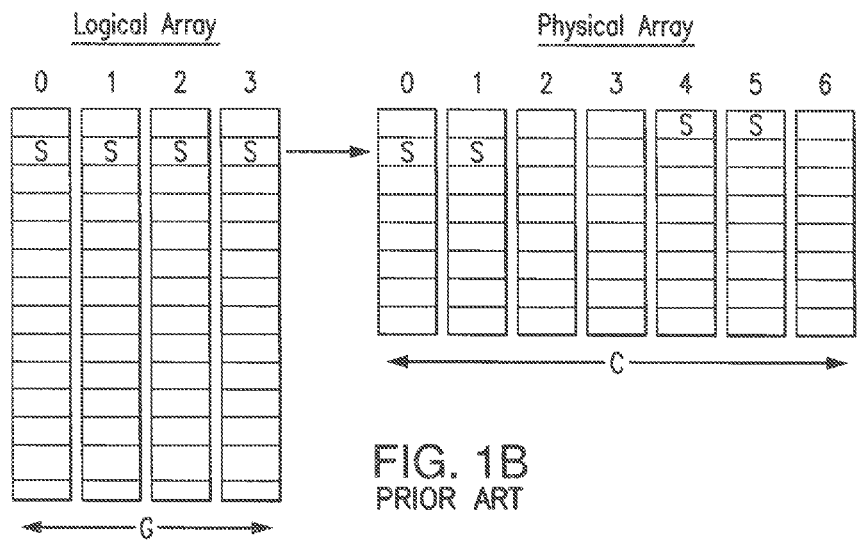
FIG. 1A represents a prior art parity and data layout in a traditional RAID organization.
FIG. 1B represents prior art principles of parity stripe de-clustering over an array of disks.
FIG. 1C represents a prior art example of data layout in a de-clustered parity organization.
Figure 2:
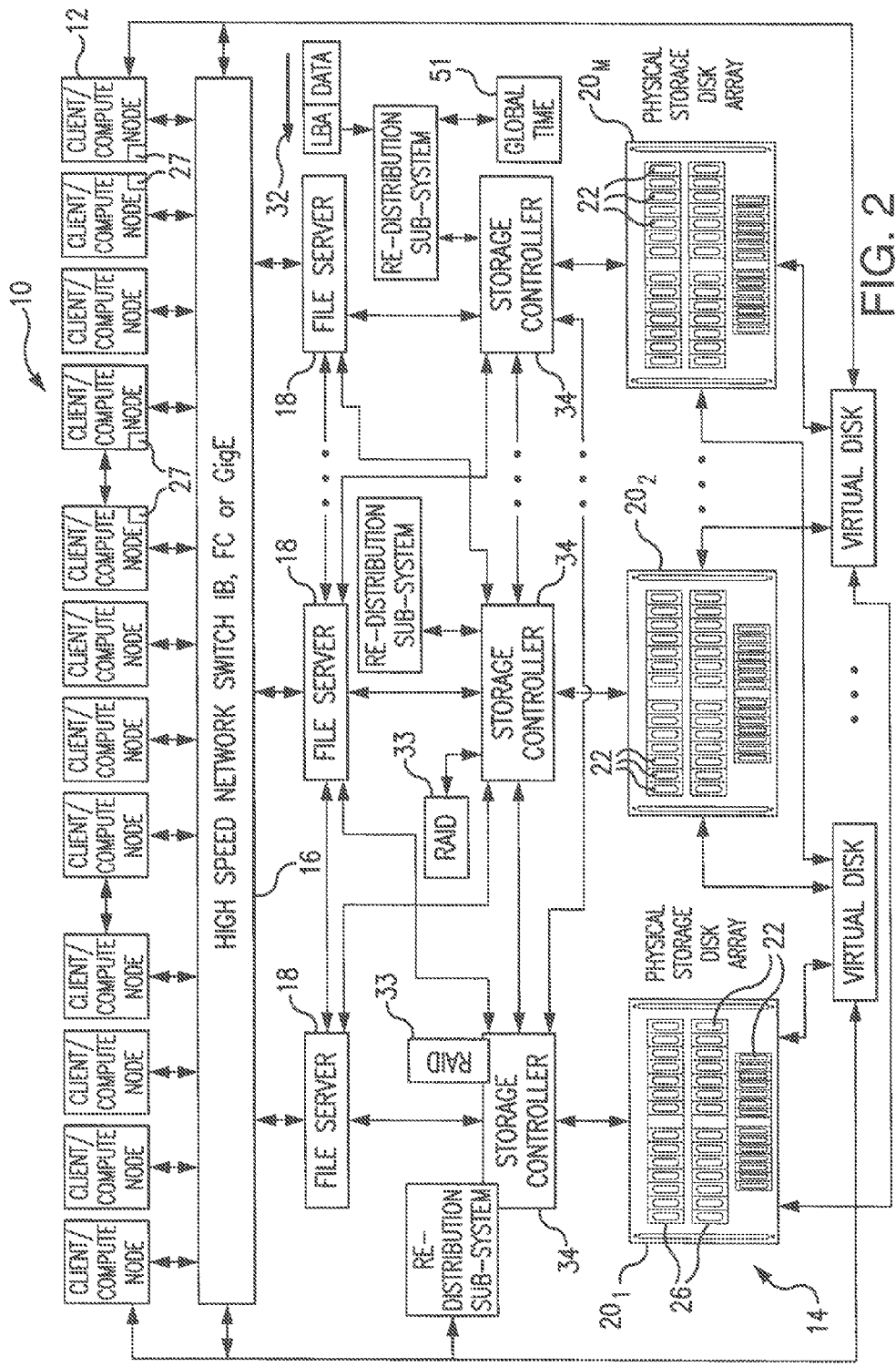
FIG. 2 is a block diagram of a simplified structure of the present system.

FIG. 2 depicts a simplified representation of the system 10 for data migration between the Client Compute Nodes 12 and a de-clustered Redundant Array of (Inexpensive) Independent Disks (RAID) storage sub-system 14. Shown in FIG. 2 is an exemplary system architecture, while numerous other implementations supporting data migration between data generating entities and RAID storage devices are contemplated in the scope of the present invention.

The compute nodes 12 may be arranged in computing groups, or computer clusters, to perform complex computations of various types. The operation of the compute nodes depends on the system application. They may function as servers, super computing clusters, etc., and have the capacity to "write" by outputting data, as well as "read" from the storage sub-system 14, or an external memory, as well as any other device. In the present description the above-presented devices will be intermittently referenced further herein also as data generating entities.

The compute nodes 12 are connected through a High-Speed Network 16 to File Servers 18 which manage data migration from and to the compute nodes 12. The ratio of the compute nodes 12 to the File Servers 18 may be in excess of a thousand in some applications. The File Servers 18 may satisfy requests of the compute nodes 12 in the same order as the requests are received at the File Server. Therefore, the File Servers receive data from the compute node 12 in a random fashion.

The data generating entities 12 generate data requests each of which contains at least one, or a number of data units D1, D2, ..., D8. The subject system 10 computes (for example, by means of a RAID processor residing with the data generating entity 12 or with the RAID unit 33) computes a data parity unit (P,Q) for each data unit in the data request in correspondence to the protection scheme preferred for the system 10. Subsequently, a parity stripe is computed for the entire data request which includes all data units $D_1, \ldots, D_8$ in the data request and their respective data parity units.

During the input/output (I/O) cycle of the compute nodes operation, the data may be transferred from the compute nodes' cache to the File Servers which may place data in the file system for subsequent retrieval. The High Speed Network 16 functions as a high speed switch and may be based on any of the network transport protocols, such as, for example, Infiniband (IB), Fibre Channel (FC), Gigabit Ethernet (GigE), etc.

System 10 is capable of handling any type of data transfer. Data retrieved from the compute nodes 12, and/or File Servers 26 (combinably referred to herein also as data generating entities) is intended to be stored on disk drives 22 which may be arrayed in any format, shown, for example, as storage disk arrays $20_1, 20_2, \ldots, 20_M$. The storage disk arrays may be arranged, for example, in the RAID (Redundant Array of Independent Drives) format. Each RAID storage disk array $20_1, 20_2, \ldots, 20_M$, is a multi-dimensional array of physical disk drives 22 distributed in Read/Write tier groups 26 for storing data D and parity values P (as well as Q) computed for the data stored in the array. Each tier group 26 in the array $20_1, 20_2, \ldots, 20_M$ constitutes a multiplicity of data disk storage channels.

Figure 3:
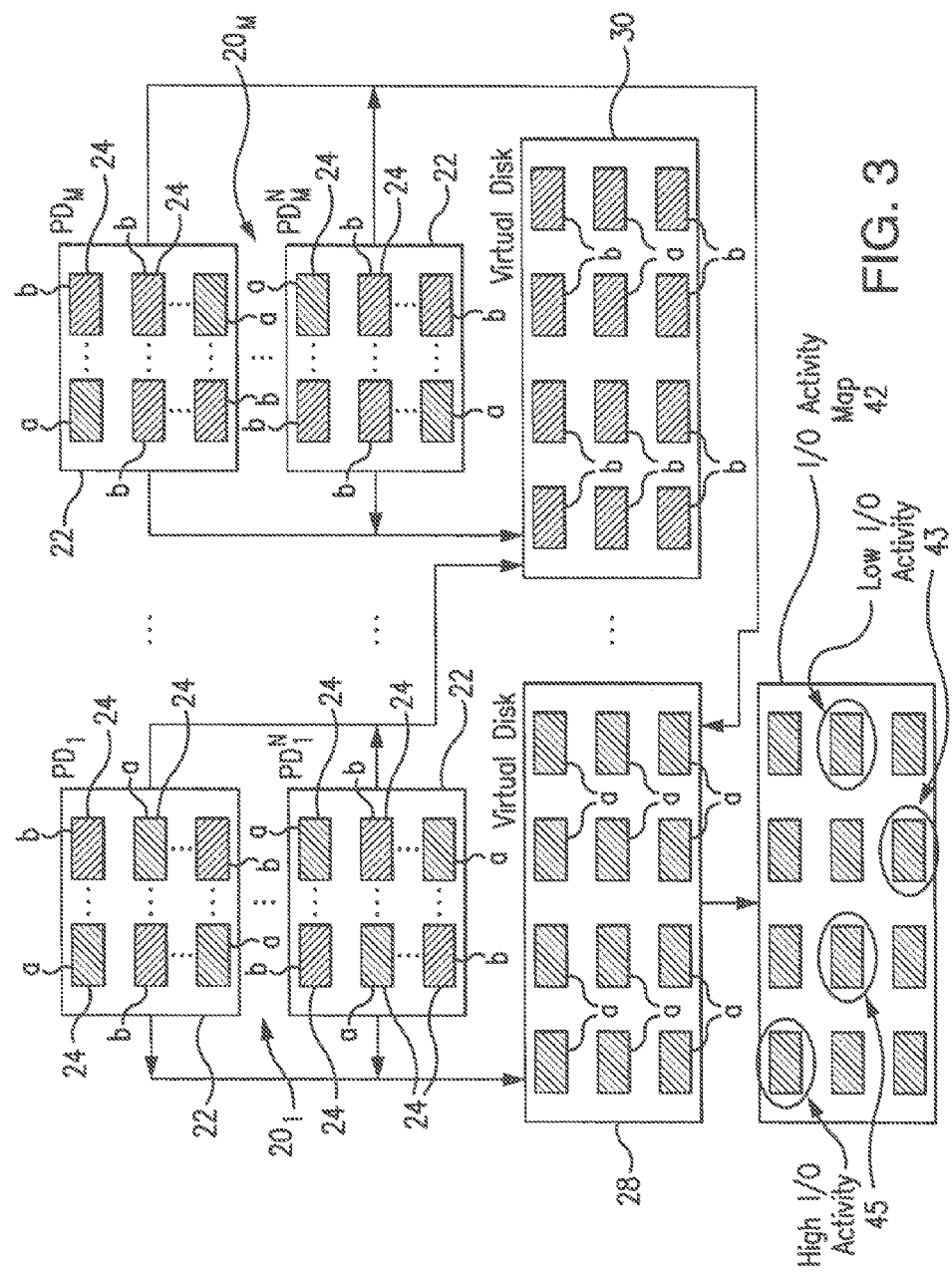
FIG. 3 is a schematic representation of a concept of virtual disks formulation with a plurality of Physical Disk Extents.

In the present system, the RAID storage sub-system 14 is preferably a de-clustered RAID storage in which the redundant disk arrays $20_1, 20_2, \ldots, 20_M$ include a plurality of physical data storage disks 22 (further referred to herein as physical disks, or PD), each of which, as presented in FIG. 3, contains a number of Physical Disk Extents (PDEs) 24.

Normally, a physical disk has a certain memory size, for example, 1, 2, 4, or 8 terabytes, which is divided into logical pieces called Physical Disk Extents, for example 8 gigabytes in size. Thus, each PD 22 may include, for example 1024 sections, or PDEs 24. The total number of PDEs 24 at different PDs 22 may differ one from another, but, preferably, their physical size is the same.

The Physical Disks 22 in each array $20_1, 20_2, \ldots, 20_M$ may be of any type including traditional spinning disk drives, as well as solid state disks, such as flash memory, phase-change memory, memristors, as well as fiber channel physical disks, PDEs, SAS PDEs, or other non-volatile data storage carriers. For example only (but not to limit the scope of protection of the present invention to the specific implementation), the physical disks 22 will be referred to as disk drives. However, any other memory storage media is contemplated in the scope of the present invention.

As depicted in FIG. 3, physical data storage disks $PD_1, \ldots, PD_1^N$ cumulatively form the physical storage disk array $20_1$, while physical disks data storage $PD_M, \ldots, PD_M^N$ form the storage disk array $20_M$.

One or more virtual disks, for example, virtual disks 28, 30, are configured from PDEs of the physical disks presented in either of the storage disk arrays $20_1, 20_2, \ldots, 20_M$. For example, the PDEs "a" residing on the $PD_1, \ldots, PD_1^N$, and $PD_M, \ldots, PD_M^N$ are included in the virtual disk 20, while the PDEs "b" are included in the virtual disk 30.

The PDEs included in the same virtual disk may physically reside at any physical disk 22, and in any physical storage disk array $20_k, 20_2, \ldots, 20_M$. In some instances, the virtual disks 28, 30 partially overlap each with the other, i.e., contain at least one PDE included in both virtual disks 28, 30.

The inclusion of the PDEs in the specific virtual disks may be dynamically changed as required by the data migration process. Each of the virtual disks 28, 30 formed in the present system reside on at least a portion of the plurality of physical disks 22 contained in any storage disk arrays $20_1, 20_2, \ldots, 20_M$.

The data generating entities 12 do not view the physical disks 22, and do not identify the PDEs 24 by their physical addresses associated with the corresponding Physical Disks. In the present system, each data generating entity 12 "views" the data storage sub-system 14 as a pool of virtual disks 28, 30 with each PDE 24 identified by its Logical Block Address (LBA). Logical Block Address is a part of a linear addressing scheme where blocks are located by an integer index, with the first block, for example, being $LBA_0$, the second block being $LBA_1$, etc. As it is known to those skilled in the art, in the Logical Block Addressing, typically only one number is used to address data, and each linear base address describes a single block. The LBA scheme replaces schemes which expose the physical details of the storage to the software of the operating system.

Each compute node 12 has a software unit 27 (shown in FIG. 2) which controls the operation of the respective compute node for the intended purposes and allocates I/O cycles during the execution of the compute node process.

In the virtual disks 28 and 30, each PDE 24 has a specific LBA which the data generating entities indicate in their requests when I/O activity is desired.

When a specific data generating entity 12 issues I/O request 32, which may be of different nature, for example, "write" or "read" request, the request 32 is sent through the High Speed Network switch 16 to a PDE 24 of interest whose LBA is included in the request 32.

During operation, a virtualized RAID unit 33 (shown in FIG. 2) applies RAID calculations to data ingress from a data generating entity prior to "writing" the data in the PDE of interest. As a part of the RAID calculations, parity values are calculated for the ingress data. Space in the data storage devices (particularly, specific PDEs) for the parity values is allocated for example by the RAID unit, or a storage controller, or the data generating entity. Data may be interleaved in stripe units distributed with parity information across a specific sequence of PD:PDEs, as for example shown in FIGS. 5A-5B and 7A-7B. The parity scheme in the RAID may utilize either a two-dimensional XOR algorithm or a Reed-Solomon Code in a P+Q redundancy scheme.

The RAID unit may perform data reconstruction when "read" requests are serviced when corrupted or lost data is found. The parity values are used to reconstruct the data during "read" operations.

A number of storage controllers 34 are included in the structure. As shown in the exemplary implementation depicted in FIG. 2, each storage controller 34 may be operatively coupled between the client compute nodes 12 and a respective storage disk array $20_1, 20_2, \ldots, 20_M$ for controlling data migration to and from the respective disk array.

The RAID unit 33, in an exemplary implementation, may reside in a respective Storage controller in operative connection to the data generating entities. However, alternative implementations supporting the RAID engine functionality in the present system are also contemplated. These may include, for example, a centralized RAID engine, etc.

A specific connection between each storage controller and the corresponding storage disk array shown in FIG. 2 is only one example of numerous other implementations of operative interconnection between the storage controller(s) and the data storage sub-system contemplated in the present data migration system. For example, all storage controllers may be configured to perform identical functions, and be interchangeable. Alternatively, one of the storage controllers may be appointed (for example, by a host) to perform parity calculations, while other storage controllers may be 'tasked' to perform the role of the data storage controllers in accordance with the size and type of the "write" (or "read") data passing through the data channels, etc. Also, a specific function of the storage controllers, their number in the system, as well as the number (and collection) of the Physical Drives and PDEs controlled by a specific Storage controller may be adaptively defined, as needed, for servicing a specific "write" and/or "read" request.

The disk drives 22 must be spared from operations where the heads that record the data on the physical disks have to move over various sectors of the same drive (a.k.a. drive thrashing), thus taking a great deal of time (seeking time) compared to the actual "write" or "read" operation of the system.

Storage controller 34 controls the operation of the disks 22 in the corresponding disk arrays $20_1, 20_2, \ldots, 20_M$. In the present system, the disk drives 22 are accessed in an optimally efficient manner for the disk drives exploitation, providing uncompromised I/O performance of a storage controllers of the storage disk arrays $20_1, 20_2, \ldots 20_M$. Disk drives 22 are provided with the capability of receiving (or accessing) data in the optimally efficient manner, so that the system 10 avoids the need for an excessive number of disk drives for writing or reading data.

The capability of executing a specific request in an efficient manner in the system 10 is provided by utilizing a processor sub-system 36, which is configured to perform as a re-distribution management sub-system (also referred to herein as a re-distribution management processor sub-system) which may be operatively coupled between the data generating entity 12 and a respective storage controller 34, or in some implementations, may reside on the storage controller 34. The specifics of the re-distribution management processor sub-system 36 will be presented further herein in conjunction with FIGS. 4 and 6A-6B.

Figure 4:
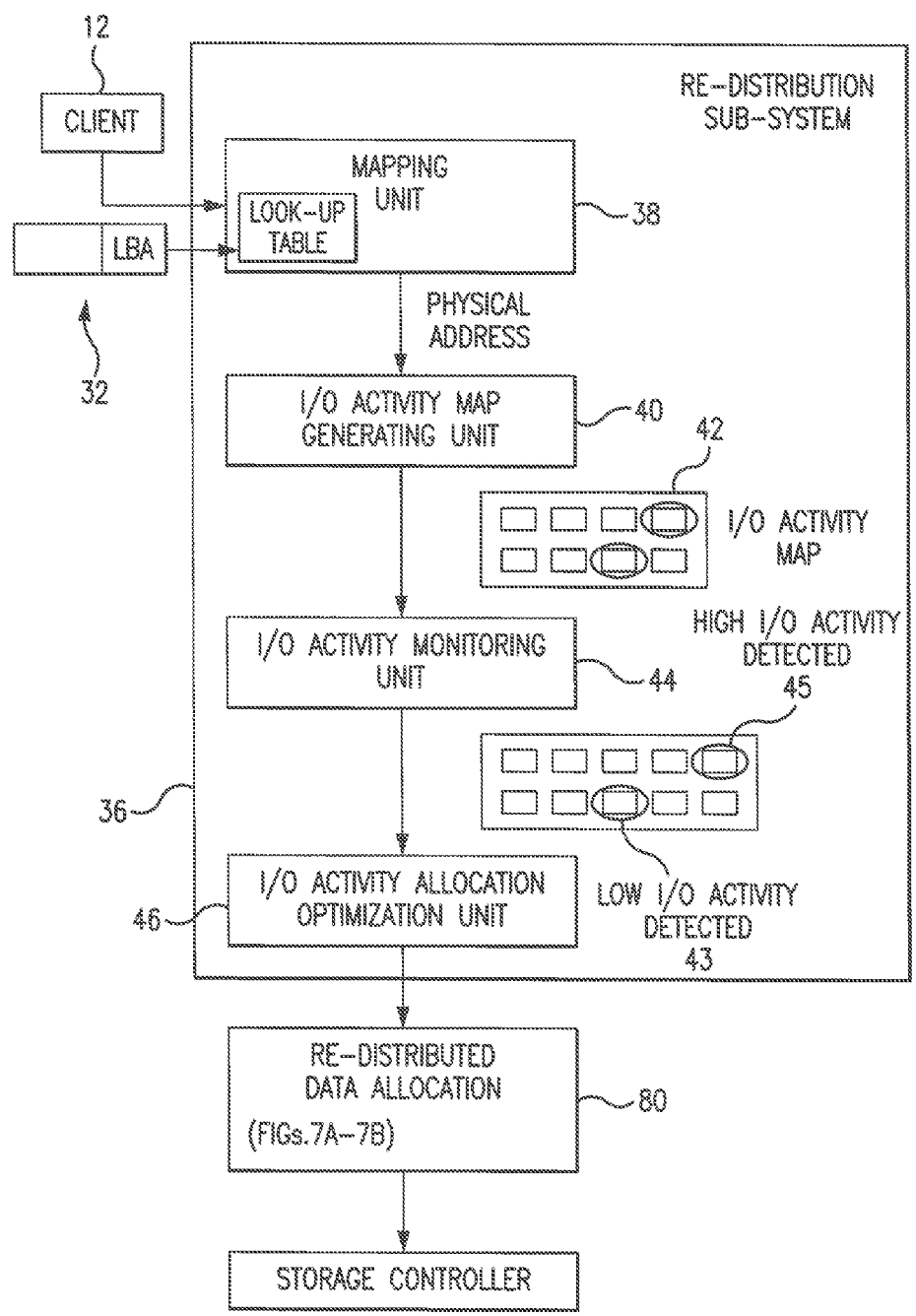
FIG. 4 is a schematic representation of the subject re-distribution sub-system.

Referring to FIG. 4, the re-distribution management processor sub-system 36 may include a processor unit 38 configured to operate as a mapping unit (also referred to herein as a mapping processor unit) coupled operatively to a respective data generating entity 12 and configured to extract therefrom the logic address, i.e., the LBA, of a PDE 24 of interest. The mapping processor unit 38 is configured to compute a correspondence between the LBA defined in the request 32 and a physical address of the respective PDE 24 of interest, i.e., the physical address relative to a physical disk 22 where the PDE in question resides. Specifically, the mapping processor unit associates each PDE with its respective physical disk based on the PDE's LBA. For example, the mapping processor unit 38 may use a Look-up Table for physical address computation.

The physical address of the PDE of interest is entered into a processor unit 40 configured as an I/O activity map generating processor unit which is operatively coupled to the mapping processor unit 38 and is configured to create an I/O activity map 42. The I/O activity map is a representation of an I/O activity of the data generating entities 12 mapped to the "collection" of PDEs on the disk drives 22 corresponding to a specific virtual disk.

The map 42 may be presented in a variety of formats. As for example shown in FIGS. 3 and 4, the I/O activity map 42 may be presented as a graph representing an activity "heat" map where respective PDEs are indicated as having higher activity, while other PDEs having lower activities.

I/O activity map 42 is monitored by a processor unit 44 configured to operate as an I/O activity monitoring processor unit which detects so-called "hot spots" 45 on the map 42 which represent PDEs exhibiting the I/O activity which exceeds a predetermined I/O activity level. The "hot spots" found on the I/O activity map 42 represent opportunities for improvement of placement of the data requested by the data generating entity 12 in the virtual disks, as well as physical disks.

The I/O activity monitoring processor unit 44 also identifies the "cold spots" 43 on the I/O activity map 42, i.e., the under-used PDEs which are accessed seldomly or not accessed at all for a predetermined period of time. These "cold spots" 43 represent PDEs with the I/O activity below a predetermined minimal level.

Shown in FIGS. 5A and 5B are the representations of the I/O activity allocation in, for example, virtual disk 28 (FIG. 5A) and virtual disk 30 (FIG. 5B). In both I/O activity allocation maps, each row is shown with a corresponding parity strip distributed (de-clustered) on different PDs and PDEs. As shown, D1, D2, ... D8 columns represent data units, while P and Q columns represent parity units calculated by applying XOR function to the data units in the parity stripe.

On the intersection of each column and the row in each FIGS. 5A and 5B, the pair PD:PDE represents a physical address of the PDE where a data unit or a parity unit is located. The number before the column mark represents a physical number of the physical disk, and the number after the column mark represents a physical address of the PDE on the respective physical disk.

For example, in FIG. 5A, on the intersection of the column $D_2$ and the row 2, the number 162:0 means that the data unit $D_2$ of the parity stripe depicted in row 2 is stored at the physical disk number 165, in the PDE having an address "0" thereon.

The mapping processor unit 38 extracts the LBA from the request 32 received from the data generating entity 12, and computes the physical address of the PDE where data is to be written to or read from.

As may be seen in FIG. 5A-5B, in both virtual disks 28, 30, there are several "spots" where the virtual disks 28, 30 overlap and have the potential for resource contention. For example, in FIG. 5A, in row 1, column D1, there is a PD:PDE pair (22:0) which indicates that the virtual disk No. 22 is using this PDE as part of its definition. In the map presented in FIG. 5B, the PDE "1" is also located on the physical disk No. 22 (22:1) as shown at the intersection of the column D1 and row 3. This means that both virtual disks 28 and 30 overlap at the same physical disk No. 22 with two different addresses for PDEs, i.e., 0 (on virtual disk 28) and 1 (on virtual disk 30).

Two more potentials for resource contention exist on the physical disk No. 244 (column D3; row 3 in virtual disk 28) and (column D3; row 3 in virtual disk 30). In addition, the potential for resource contention exists on the physical disk No. 487 (for both virtual disks 28, 30). This PD:PDE pair may be found on intersection of column D6 and row 5.

As the virtual disks 28 and 30 are accessed, statistics are kept for the I/O activity for each PDE. Once for a given period of time, the activity maps 42 are searched for high usage by the I/O activity monitoring processor unit 44.

Figure 6A:
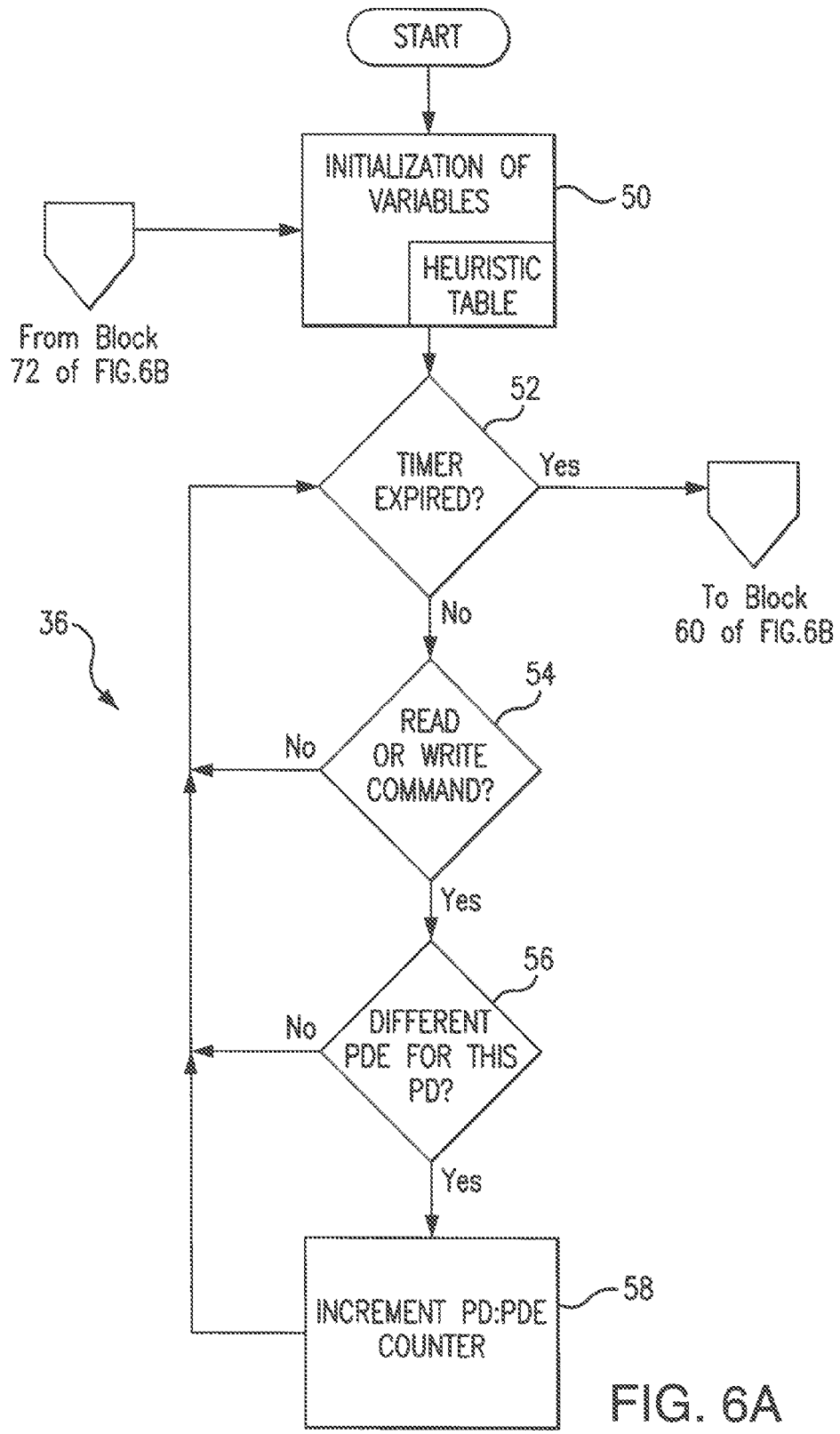
FIGS. 6A and 6B are representative of the flow chart diagram of the automatic data re-distribution process supported by the subject system.
Figure 6B:
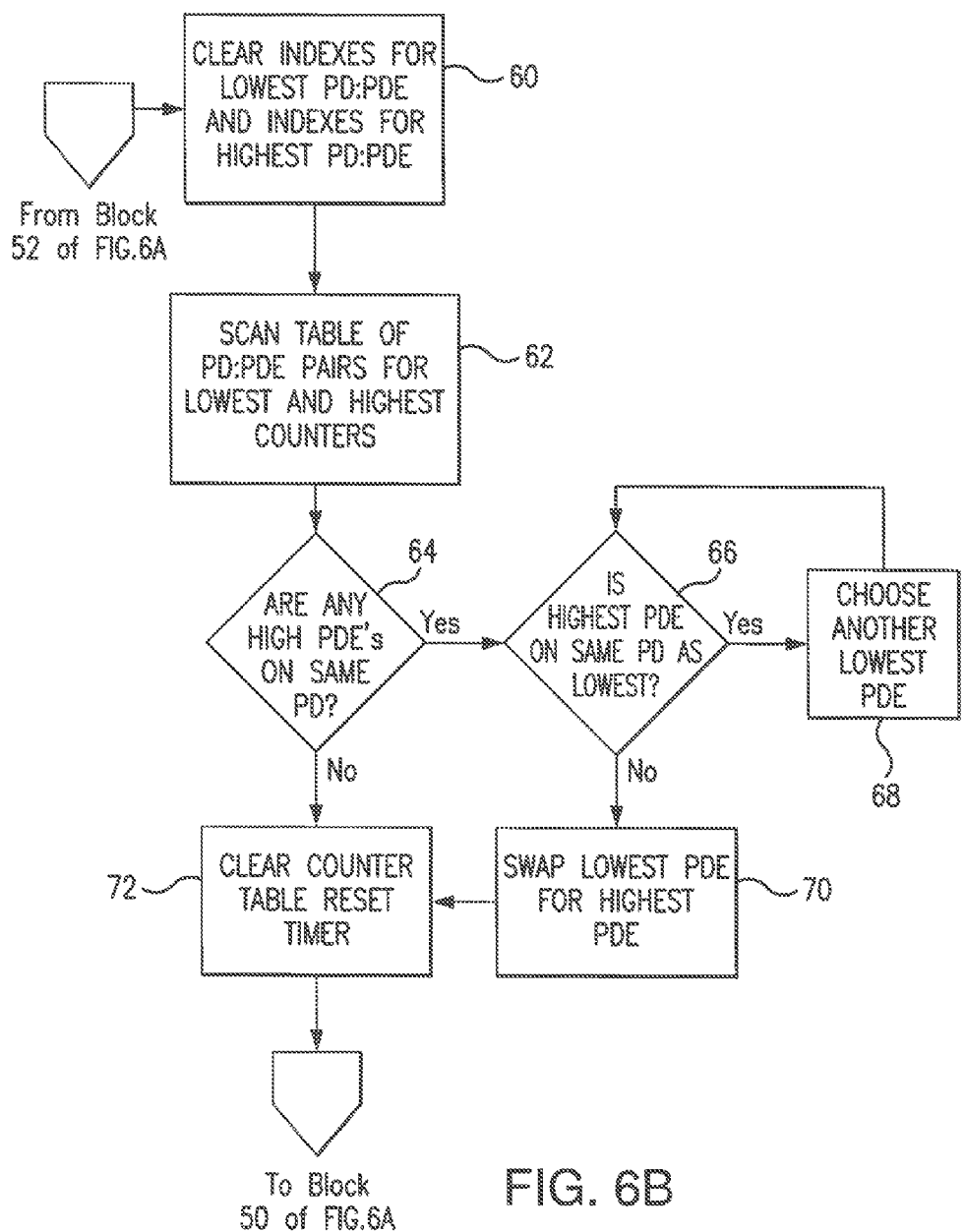

If the high activity for a particular physical disk drive (PD) may be attributed to more than one PDE, then a processor unit 46 which is configured as a I/O activity optimization processor subsystem of the re-distribution processor sub-system 36 is executed in order to separate the "hot" PDEs one from another, as will be detailed further herein with respect to FIGS. 6A and 6B. The separation of the "hot" PDEs has the effect of reducing actuator thrashing between PDEs, which in turn reduces the average latency for a given I/O.

For example, as seen in FIGS. 5A and 5B, disk drives 487 and 244 may experience thrashing due to the repeated "read" and "write" activities on their respective RAID sets (parity stripes). Depending on the size of the PDE and the number of tracks needed to seek between the PDEs, the drive actuator could be doing a full drive sweep between the two virtual disks 28 and 30 which is a highly undesirable situation.

Referring to FIGS. 6A and 6B, representing the flow chart diagram of the re-distribution management processor subsystem 36, the logic initiates the operation in computing block 50 "Initialization of Variables" where a heuristic data table is initiated, with some variables which are to be initialized to begin the process. For example, a processor 51 configured as a global timer processor 51 (shown in FIG. 2) that defines the sampling time for gathering heuristic data for the heuristic table and a data structure for capturing the number of times a specific PDE is accessed are initialized in block 50.

The global timer processor 51 in this embodiment may be implemented as a timer for counting a countdown time that starts at a programmable level and then counts down while data is gathered.

Upon initializing the global timer and data structure for capturing the number of times, a specific PDE is accessed in block 50, the logic flows to logic block 52 "Timer Expired?" which decides whether the algorithm should continue to accumulate data.

If the timer (for example 10 minutes) has expired, then the logic will continue its execution in block 60 (shown in FIG. 6B). If, however, it is decided in logic block 52 that the timer has not expired, then the process flows to logic block 54 "Read or Write Command?". In block 54, the logic applies a test routine to determine whether the request received from the data generating entity is a "read" or a "write" request. If it is neither, then the process continues its execution in block 52. If however it is decided that the request is indeed a "read" or "write" command, then the flow continues to its execution in block 56 "Different PDE for this PD?"

In block 56, the Logical Block Address (LBA) is extracted from the command. A function is called to calculate the Physical Disk (PD) and Physical Disk Extent (PDE) that the LBA resides on. Basically, the mapping unit 38 shown in FIG. 4 is configured to execute the function presented in logic block 56 shown in FIG. 6A. The test is made as to whether or not the current PDE is the same as the previous PDE access for this physical disk. If there is a PDE match, then the logic will continue its execution in block 58 "Increment PD:PDE Counter". If however there is no PDE match, then the logic returns its execution to block 52.

Upon validation in block 56 that the PD drive has moved from one PDE space to another, then the number of the new PDE location is treated as the previous PDE accessed for the particular physical disk. In the heuristic data table, the entry for this PDE is incremented to indicate the actuator head movement of the disk drive, (i.e., drive thrashing).

Upon completion of the increment PD:PDE counter in block 58, the logic control is transferred to block 52.

If in block 52, the timer has expired, the logic flows to block 60 shown in FIG. 6B "Clear Indexes for Lowest PD:PDE and Indexes for Highest PD:PDE". In block 60, the highest and lowest sets of a specific number of PDE counters (for example, five PDE counters) are cleared. This is done in anticipation of the results of the search for a PDE with more than one highly active PDE counter.

From block 60, the logic moves to block 62 "Scan Table of PD:PDE Pairs for Lowest and Highest Counters" where the scan is performed through the heuristic table for the five highest PDE counters and also for the five lowest PDE counters. The highest PDE counters are the counters having the activity level exceeding a predetermined activity level, while the lowest PDE counters are counters of the PDEs whose activity level is below a predetermined minimum activity level.

Once the table scan has been completed, the logic control is passed to logic block 64 "Are any High PDEs on the Same PD?" In block 64, a test is applied in order to determine if any of the highest PDE counters occupy the same physical disk. If it is determined that two or more of the PDEs do reside on the same PDE, and if the counter levels of the PDEs exceed a preset activity maximum, then control is passed to block 66 "Is Highest PDE on Same PD as Lowest?" Otherwise, control is passed to block 72 "Clear Counter Table Reset Timer".

In the logic block 66, another test is applied to determine if the now selected highest PDE is on the same PD as the previously identified lowest PDE. If the two PDEs as not on the same PD, then control passes to block 70 "Swap Lowest PDE for Highest PDE". Otherwise, logic blocks to block 68 "Choose Another Lowest PDE".

In block 68, since the previous lowest PDE was on the same physical disk as the highest PDE, this block selects another of the lowest PDEs for comparison. Logic control is then passed back to block 66.

In block 70, upon two PDEs have been identified to reside on different PDEs, they are swapped with each other such that the highest count PDE is moved to the location of the lowest count PDE. The lowest count PDE is also moved to the location of the highest count PDE. Control is then moved to block 72.

In block 72, the heuristic counters are now cleared for another pass through the I/O activity maps and is passed back to block 52 shown in FIG. 6A.

As the result of the procedure applied to the initial allocation depicted in FIGS. 5A and 5B, an allocation 80 presented in FIG. 7A-7B is output (as shown in FIG. 4) may be one of the exemplary re-distribution allocations permitted by the re-distribution algorithms presented in FIGS. 4, and 6A-6B. The output 80 is provided to the respective storage controller 34 for execution.

Referring to FIGS. 4 and 7A—7B, representative of the virtual disks' new allocation 80 after the re-distribution procedure, the exemplary new allocations for executing I/O requests depicts the previous PD:PDE (244:2) in virtual disk 30 having been replaced with the new address, i.e., PD:PDE (210:0). In the virtual disk 28, the previously allocated PD:PDE (487:0) has been replaced with a different PD:PDE couple, i.e., (478:0), meaning that data request has been re-addressed from 244:2 to 210:0 (for virtual disk 30) and from 487:0 to 478:0 (for virtual disk 28).

The fact that two or more virtual disks share a drive does not mean that they necessarily have to be separated. For example, for the allocation 22:0 and 22:1 in virtual disk 28 and 30, respectively, although they reside on the same disk No. 22, no thrashing has been identified for this disk drive, and thus no re-distribution has been applied. Only those PDEs exhibiting thrashing (on the same drive) are to be separated in the present system.

The present approach reduces the movement of data units to the size of a PDE (as opposed to movement of large data volumes compatible with contains of virtual disks). Thus, the subject system performance may be highly improved even in homogeneous environments when the movement of data of the size of the PDE replaces the necessity to move entire contents of virtual disks to a slower or a faster media, an approach traditionally implemented in the area. The subject automated process of data re-distribution, as previously presented, is believed to improve the performance of storage systems. as well as to extend the life of physical disks due to a reduced actuator head movement.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A system for data migration between data generating entities and data storage arrays, the system comprising:
a de-clustered Redundant Array of Independent Disks (RAID) storage sub-system residing on a plurality of physical data storage disks, each of said plurality of physical data storage disks containing a respective number of Physical Disk Extents (PDEs), each PDE constituting a data storage unit of a predetermined size;
at least one virtual disk structure including a plurality of respective PDEs residing on at least a portion of said plurality of the physical data storage disks, wherein each respective PDE in said at least one virtual disk structure is identified by a respective Logical Block Address (LBA);
a plurality of data generating entities operatively coupled to said de-clustered RAID storage sub-system, wherein at least one of said plurality of data generating entities is configured to issue at least one respective data request for data migration between said at least one data generating entity and at least one respective PDE contained in said at least one virtual disk structure, wherein said at least one respective request contains an LBA of said at least one respective PDE, and wherein said data request includes at least one data unit;
at least one controller sub-system operatively coupled between said at least one data generating entity and said at least portion of said plurality of physical data storage disks, and configured to control data migration relative to said PDEs residing on said at least portion of said physical data storage disks; and
a re-distribution management processor sub-system residing in operative coupling to said at least one controller sub-system and said at least one data generating entity, wherein said re-distribution management processor sub-system includes:
an I/O activity monitoring processor unit operatively coupled to said plurality of respective PDEs for identification therein of at least two first PDEs exhibiting the I/O activity exceeding a first predetermined I/O activity level, and
an I/O activity allocation optimization processor sub-system operatively coupled to said I/O activity monitoring processor unit to determine whether said at least two first PDEs reside at the same physical data storage disk and said same physical data storage disk exhibits disk thrashing, and
to re-direct the execution of said at least one respective data request from at least one PDE of said at least two first PDEs to at least one PDE exhibiting an activity below a second predetermined level, thereby providing a substantially evenly distributed I/O activity among said PDEs.

2. The system of claim 1, wherein said I/O activity monitoring processor unit is further configured to identify at least two second PDEs exhibiting the I/O activity below the second predetermined I/O activity level,
wherein said I/O activity allocation optimization processor sub-system is further configured to determine whether said at least two first PDEs reside at the same physical data storage disk with said at least two second PDEs, and
to re-direct said at least one respective data request from at least one of said at least two first PDEs to at least one of said at least two second PDEs if said at least one second PDEs resides at a physical data storage disk different from said same physical data storage disk.

3. The system of claim 1, wherein said I/O activity allocation optimization processor sub-system is further configured to re-direct said at least one respective data request from said at least one of said at least two first PDEs to at least another one of said at least two second PDEs if said at least one second PDE resides at the same physical data storage disk with said at least two first PDEs.

4. The system of claim 1, wherein said at least one respective data request is selected from a group including data write and data read.

5. The system of claim 1, further including a parity computing processor configured for generation of a parity stripe for said at least one data request, wherein the parity stripe is distributed in said at least one virtual disk across a portion of said respective PDEs, said parity stripe containing said at least one data unit identified in said at least one respective data request and a corresponding at least one data parity unit computed for said at least one data unit.

6. The system of claim 1, wherein said re-distribution management processor sub-system further includes a global timer processor unit configured to define a sampling time for said I/O activity monitoring processor unit to capture a number of times each of said respective PDEs being accessed.

7. The system of claim 1, further comprising at least first and second virtual disk structures, each associated with a respective array of PDEs, each respective array of PDEs residing at a corresponding one of at least first and second portions of said plurality of physical data storage disks, respectively, and
at least first and second said controller sub-systems, each operatively coupled to a respective one of said corresponding first and second portions of the physical data storage disks, respectively,
wherein each of said at least first and second controller sub-systems support said re-distribution management processor sub-system in a peer-to-peer fashion.

8. The system of claim 7, wherein said at least first and second virtual disk structures include at least one overlapping physical data storage disk, wherein said at least two first PDEs reside at said at least one overlapping physical data storage disk, and
wherein said re-distribution management processor sub-system activates said I/O activity allocation optimization processor sub-system to redirect said at least one respective request from said at least one first PDE exhibiting the I/O activity exceeding the first predetermined level to said at least one second PDE exhibiting the I/O activity below the second predetermined level if said at least two first PDEs reside on said at least one overlapping physical data storage disk.

9. The system of claim 1, wherein said respective PDEs have substantially equal data storage capacity.

10. The system of claim 1, wherein said re-distribution management processor sub-system further includes:
a mapping processor unit operatively coupled between said at least one data generating entity and said at least one controller sub-system, said mapping processor unit being configured to compute a correspondence between said LBA of said at least one respective PDE identified in said at least one respective request and a physical address of said at least one respective PDE including identification of a respective one of said plurality of physical data storage disks containing said at least one respective PDE residing thereon.

11. The system of claim 10, wherein said re-distribution management processor sub-system further includes:
an I/O activity map generating processor unit operatively coupled to said mapping processor unit, said I/O activity map generating processor unit being configured to create an I/O activity map representative of an I/O activity of said at least one data generating entity mapped to said respective PDEs in said at least portion of said physical data storage disks.

12. A method for automatic data re-distribution in a parity de-clustered redundant storage system, the method comprising the steps of:
(a) distributing a de-clustered Redundant Array of Independent Disks (RAID) on a plurality of physical data storage disks, each physical data storage disk containing a respective number of Physical Disk Extents (PDEs), wherein each PDE of said respective number thereof constitutes a data storage unit having a predetermined size and a physical address in relation to said each physical data storage disk;
(b) forming at least one virtual disk structure from a sequence of respective PDEs residing on at least a portion of said plurality of physical data storage disks, and
identifying each respective PDE included in said at least one virtual disk structure by a respective Logical Block Address (LBA) relative to said at least one virtual disk structure;
(c) operatively coupling a plurality of data generating entities to said at least one virtual disk structure, and generating, at least one of said plurality of data generating entities, at least one respective data request for data migration between said at least one data generating entity and at least one PDE of interest included in said at least one virtual disk structure, said at least one respective data request including at least one data unit and identifying an LBA of said at least one PDE of interest;
(d) operatively coupling at least one controller sub-system between said at least one data generating entity and said at least one portion of said plurality of physical data storage disks for controlling said at least one respective request execution relative to said at least one PDE of interest;
(e) configuring said at least one controller sub-system with a re-distribution processor unit operating on said at least one controller sub-system in operative coupling to said at least one data generating entity;
(f) monitoring, by said re-distribution processor unit, an I/O activity of said at least one data generating entity relative to said respective number of PDEs;
(g) identifying, by said re-distribution processor unit, among said respective sequence of the PDEs, at least two first PDEs exhibiting an I/O activity exceeding a first predetermined I/O activity level and at least two second PDEs exhibiting an I/O activity level below a second predetermined I/O activity level;
(h) determining, by said re-distribution processor unit, whether said at least two first PDEs reside at the same physical data storage disk, and
(i) re-directing, by said re-distribution processor unit, said at least one respective data request from a respective one of said at least two first PDEs to at least one of said second PDEs if said physical data storage disk exhibits disk thrashing, thus attaining a substantially even distribution of the I/O activity among said respective PDEs, thereby optimizing the I/O activity allocation in said de-clustered RAID storage sub-system.

13. The method of claim 12, further comprising the steps of:
in said step (h), determining, by said re-distribution processor unit, whether said at least two first PDEs reside at the said physical data storage disk with said at least two second PDEs, and
in said step (i), re-directing, by said re-distribution processor unit, said at least one respective data request from said at least one respective first PDE to said at least one second PDE if said at least two second PDEs if said at least two first PDEs reside on the same physical data storage disk, and said at least one second PDE resides on a different physical data storage disk.

14. The method of claim 12, further comprising the steps of:
in said step (i), re-directing, by said re-distribution processor unit, said at least one respective data request from said at least one first PDE to at least another of said at least two second PDEs if said at least one second PDE resides at the same physical data storage disk with said at least two first PDE.

15. The method of claim 12, further comprising the steps of:
in said step (e), computing, by said re-distribution processor unit, a correspondence between said LBA of said at least one PDE indicated in said at least one respective data request issued by said at least one data generating entity and said physical address of said at least one PDE of interest.

16. The method of claim 15, further comprising the steps of:
upon computing the correspondence between said LBA and said physical address of said at least one PDE of interest,
generating, by said re-distribution processor unit, an I/O activity map representative of an I/O activity of said at least one data generating entity relative to said sequence of the respective PDEs in said at least a portion of said physical data storage disks.

17. The method of claim 12, further including the steps of:
computing a parity stripe for said data request, and distributing a said parity stripe in said at least one virtual disk across said sequence of respective PDEs of said at least portion of said plurality of physical data storage disks, said parity stripe containing said at least one data unit of said data request and a corresponding at least one data parity unit computed for said at least one data unit.

18. The method of claim 15, further comprising the steps of:
prior to said step (f), con figuring and actuating a global timer processor unit to define a sampling time for said I/O activity monitoring routine, and
counting, during said sampling time, a number of times each of said sequence of respective PDEs being accessed.

19. The method of claim 12, further comprising the steps of:
in said step (b), forming at least a first and a second virtual disk structures, wherein each of said first and second virtual disk structures is associated with a respective sequence of PDEs residing in at least first and second portions of said plurality of physical data storage disks, respectively;

in said step (e), operatively coupling at least first and second said controller sub-systems to said re-distribution processor unit in a peer-to-peer fashion; and in said step (d), operatively coupling a respective one of at least first and second controller sub-system to a respective one of said at least first and second portions of the plurality of physical data storage disks, respectively.

20. The method of claim 19, wherein in said step (b), said at least first and second virtual disk structures include at least one overlapping physical data storage disk, and wherein in said step (g), said at least two first PDEs reside at said at least one overlapping physical data storage disk, said method further comprising the steps of:

in said step (i), activating, by said re-distribution processor unit, the routine of re-directing said at least one respective request from at least one first PDE to said at least one second PDE if said at least two first PDEs reside on said at least one overlapping physical data storage disk.

\* \* \* \* \*